United States Patent
Kaczmarczyk et al.

(10) Patent No.: US 11,047,730 B2
(45) Date of Patent: *Jun. 29, 2021

(54) AUXILIARY PAYMENT STATION IN THE FORM OF A SHOPPING TROLLEY

(71) Applicant: ZeroQs Sp. z.o.o., Olsztyn (PL)

(72) Inventors: Jarostaw Kaczmarczyk, Radzymin (PL); Tomasz Brulinski, Ciechanów (PL)

(73) Assignee: ZEROQS Sp. z.o.o., Olsztyn (PL)

( * ) Notice: Subject to any disclaimer, the term of this patent is extended or adjusted under 35 U.S.C. 154(b) by 0 days.

This patent is subject to a terminal disclaimer.

(21) Appl. No.: 16/926,809

(22) Filed: Jul. 13, 2020

(65) Prior Publication Data
US 2020/0340852 A1 Oct. 29, 2020

Related U.S. Application Data

(63) Continuation of application No. 16/095,026, filed as application No. PCT/PL2017/050022 on Apr. 18, 2017, now Pat. No. 10,732,027.

(30) Foreign Application Priority Data

Apr. 20, 2016 (PL) .......................................... 416908

(51) Int. Cl.
*G01G 19/414* (2006.01)
*B62B 3/14* (2006.01)
(Continued)

(52) U.S. Cl.
CPC ............... *G01G 21/23* (2013.01); *B62B 3/14* (2013.01); *B62B 5/00* (2013.01); *G01G 19/4144* (2013.01);
(Continued)

(58) Field of Classification Search
CPC .... G01G 21/23; G01G 19/4144; G01G 19/52; B62B 3/14; B62B 5/00; G06Q 30/0633
(Continued)

(56) References Cited

U.S. PATENT DOCUMENTS

| 5,551,578 A | 9/1996 | McCue |
| 5,662,342 A | 9/1997 | Basharat |

(Continued)

FOREIGN PATENT DOCUMENTS

| CN | 2093388 U | 1/1992 |
| CN | 2097586 U | 3/1992 |

(Continued)

OTHER PUBLICATIONS

PCT International Search Report and Written Opinion dated Jul. 21, 2017 in corresponding Application No. PCT/PL2017/050022, 9 pages.

*Primary Examiner* — Jacques M Saint Surin
(74) *Attorney, Agent, or Firm* — Soody Tronson; STLG Firm

(57) ABSTRACT

An auxiliary payment station in the form of a shopping trolley with a scale (2) fixed to its bottom, including elements (10, 11, 12, 13) of electronic equipment located in a casing (9) mounted in the container, and visual elements (4, 8) of the electronic equipment fixed to a handle (6) of the container. A loading inner container (1) is located in an outer container (3), and a mounting plate (15) of a carrying frame (14) is fixed to a bottom of the scale (2), and an edge mounting plate (16) of the carrying frame (14) is fixed to a bottom of the outer container (3) at its edge. The mounting plate (15) of the carrying frame (14) is fixed on a bar (18) of the carrying frame (14) extending through an opening (19) in the bottom of the outer container (3).

16 Claims, 1 Drawing Sheet

(51) Int. Cl.
*B62B 5/00* (2006.01)
*G01G 19/52* (2006.01)
*G06Q 30/06* (2012.01)
*G01G 21/23* (2006.01)

(52) U.S. Cl.
CPC ......... *G01G 19/52* (2013.01); *G06Q 30/0633* (2013.01)

(58) Field of Classification Search
USPC ........................................................ 177/136
See application file for complete search history.

(56) References Cited

U.S. PATENT DOCUMENTS

| | | | |
|---|---|---|---|
| 5,729,697 A | 3/1998 | Schkolnick | |
| 8,371,504 B2 | 2/2013 | Connelly | |
| 10,266,196 B1 | 4/2019 | Sinha | |
| 10,732,027 B2 * | 8/2020 | Kaczmarczyk | G01G 19/4144 |
| 2004/0026503 A1 | 2/2004 | Gantz | |
| 2005/0017068 A1 * | 1/2005 | Zalewski | G06Q 20/3229 235/380 |
| 2015/0206121 A1 | 7/2015 | Bentsur et al. | |

FOREIGN PATENT DOCUMENTS

| | | | |
|---|---|---|---|
| CN | 201346384 Y | 11/2009 | |
| CN | 201520317 U | 7/2010 | |
| CN | 203805932 U | 9/2014 | |
| CN | 105216845 A | 1/2016 | |
| DE | 19643122 A1 | 4/1998 | |
| DE | 19944153 A1 | 8/2000 | |
| DE | 202006000074 U1 | 6/2006 | |
| GB | 2457315 A | 8/2009 | |
| GB | 2472657 A | 2/2011 | |
| JP | H370674 A | 3/1991 | |
| JP | 1997277937 A | 10/1997 | |
| JP | 3092357 U | 3/2003 | |
| PL | 408977 | * 1/2016 | G06Q 20/00 |
| PL | 408977 A1 | 2/2016 | |
| WO | 2006085745 A1 | 8/2006 | |
| WO | 2011088568 A1 | 7/2011 | |
| WO | 2016012933 A1 | 1/2016 | |

* cited by examiner

AUXILIARY PAYMENT STATION IN THE FORM OF A SHOPPING TROLLEY

RELATED APPLICATIONS

This application is a continuation application of U.S. application Ser. No. 16/095,026, filed Oct. 19, 2018, which is a national stage application of PCT/PL2017/050022, filed Apr. 18, 2017, which claims the benefit of priority from Polish Application No. PL416908, filed Apr. 20, 2016, the disclosures of which are incorporated herein by reference in their entirety.

TECHNICAL FIELD

The object of the invention is an auxiliary payment station in the form of a shopping trolley used in particular in self-service stationary stores.

BACKGROUND ART

From the Polish patent application P.408977, entitled "Stanowisko platnicze w samoobslugowych . . . ", there is known an auxiliary payment station in the form of a shopping trolley. It is characterized by the fact that a barcode reader is located on a metal plate fixed between a handle of the trolley and an upper edge of a loading basket. Also, an auxiliary touchscreen in a plastic casing is fixed between the handle of the trolley and the upper edge of the loading basket. A bottom of the loading basket is formed by a horizontally arranged polymeric plate to which a scale in the form of a platform is fixed. There is a plastic casing present in the front part of the loading basket. Inside it there is an auxiliary control computer, an auxiliary wireless Wi-Fi connection module, an electric battery and an RFID identifier. In a front wheel, a wheel rotation speed monitoring system is arranged, consisting of an inductive sensor and a toothed ring. Inside the casing there are cap-protected openings with leads for electric battery terminals. This provides for charging thereof from a 230 V electrical grid using a suitable rectifier.

A disadvantage of the known solution is exposing the scale to damage and decalibration, which may result from impacts occurring in everyday use.

DISCLOSURE OF THE INVENTION

The object of the invention is to eliminate factors affecting rapid destruction of the scale.

The essence of the solution according to the invention is that a loading inner container is located in an outer container, and a mounting plate of a carrying frame is fixed to a bottom of a scale. An edge mounting plate of the carrying frame is fixed to a bottom of the outer container at its edge. The mounting plate of the carrying frame is fixed on a bar of the carrying frame extending through an opening in the bottom of the outer container. The mounting plates of the carrying frame are fixed by welding. The mounting plates of the carrying frame are fixed with screws.

The scale is fixed to a bottom of the loading inner container by welding. The scale is fixed to the bottom of the loading inner container by means of screws.

BRIEF DESCRIPTION OF DRAWINGS

The object of the invention is illustrated by an example of embodiment in a drawing wherein.

EXAMPLES

Description of an Embodiment

Figure 1:
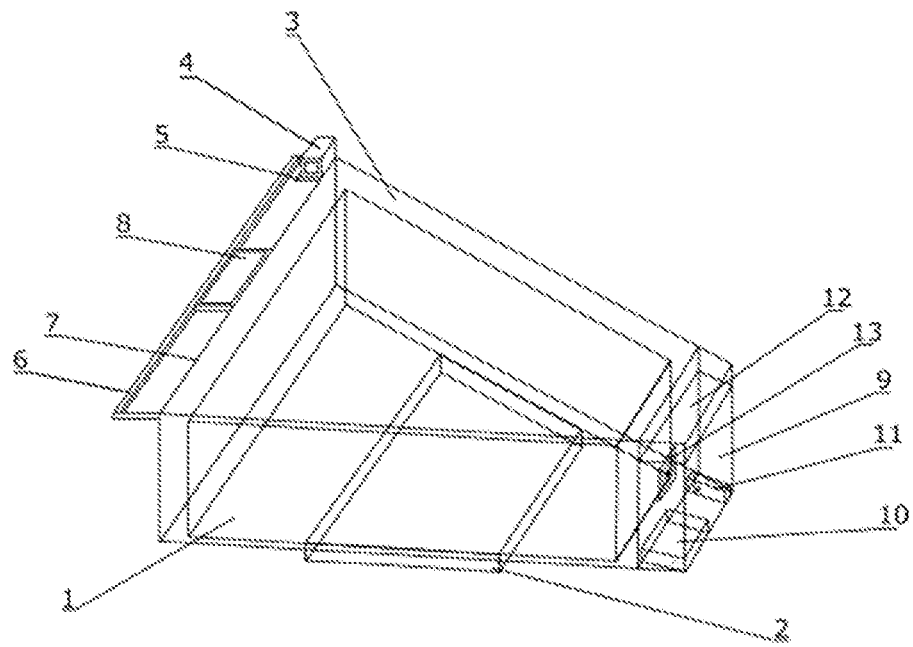
FIG. 1 shows an auxiliary payment station in a perspective view without considering a carrying frame, and FIG. 2—the auxiliary payment station in side view including the carrying frame.
Figure 2:
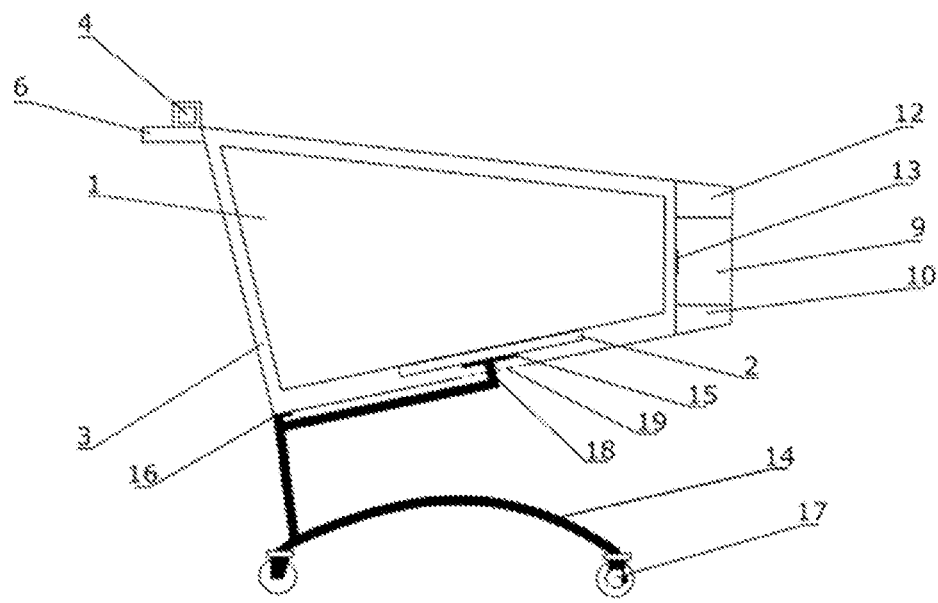

As shown in FIG. 1 and FIG. 2, the auxiliary payment station includes a loading inner container 1 located inside an outer container 3. A scale 2 in the form of a platform is fixed by welding to an outer bottom surface of the loading inner container. A mounting plate 15 of a carrying frame 14 is welded to a bottom surface of the scale 2. The mounting plate 15 is fixed on a bar 18 of the carrying frame 14, which extends through an opening 19 in a bottom of the outer container 3. The carrying frame 14 is provided on its edge with an edge mounting plate 16 that is welded to the bottom of the outer container 3 at its edge. The carrying frame 14 has wheels mounted at the bottom. In a front wheel, a wheel rotation speed monitoring system 17 is arranged, consisting of an inductive sensor and a toothed ring.

A plate 5 and an auxiliary touchscreen 8 are fixed between a handle 6 of the outer container and an upper edge 7 thereof. A barcode reader 4 is located on the plate 5. In the front part of the outer container 3 there is a casing 9 fixed. Inside it, there are an auxiliary control computer 10, an auxiliary wireless connection module 11, an electric battery 12 and an RFID identifier 13. Inside the casing 9 there are cap-protected openings with leads for electric battery 12 terminals. This provides for charging thereof from a 230 V electrical grid using a suitable rectifier.

Both containers 1, 3 are mounted on the carrying frame 14 independently of each other and they don't contact each other directly at any point of the structure. Such structure protects the scale 2 from such factors as impacts that may cause damage thereto and decalibration thereof, as the outer container 3 fulfills, among others, a protective role for the loading inner container 1.

LIST OF DESIGNATIONS

1. Loading inner container
2. Scale
3. Outer container
4. Barcode reader
5. Plate
6. Handle of the outer container
7. Upper edge of the outer container
8. Auxiliary touchscreen
9. Casing
10. Auxiliary control computer
11. Auxiliary wireless connection module
12. Electric battery
13. RFID identifier
14. Carrying frame
15 Mounting plate
16. Edge mounting plate
17. Wheel rotation speed monitoring system
18 Bar
19 Opening

What is claimed:

1. A mobile payment station comprising:
    a frame having a handle defined thereon;
    at least one wheel coupled to a lower portion of the frame and configured to roll along a surface to permit movement of the payment station along the surface;
    a loading container fixed on an upper portion of the frame and configured to hold items;
    an outer container surrounding at least a portion of the loading container and coupled to the frame;
    a weight scale fixed to a bottom of said loading container configured to sense a weight of items in the loading container;
    an electronic product identification device coupled to the frame;
    an electronic display coupled to the frame; and
    a computer processing device communicatively coupled to the weight scale, the electronic product identification device and the electronic display.

2. The mobile payment station of claim 1, wherein the weight scale is disposed within the outer container.

3. The mobile payment station of claim 2, further comprising a wireless communication device operative to couple the computer processing device to external computer processing devices.

4. The mobile payment station of claim 3, further comprising a power source for providing power to the computer processing device, the weight scale, the electronic product identification device, the electronic display and the wireless communication device.

5. The mobile payment station of claim 1, wherein the electronic product identification device comprises at least one of a bar code reader and an RFID reader.

6. A mobile payment station, comprising:
    a frame having a handle defined thereon;
    at least one wheel coupled to a lower portion of the frame and configured to roll along a surface to permit movement of the payment station along the surface;
    a loading container fixed on an upper portion of the frame and configured to hold items;
    a weight scale below a bottom of the loading container configured to sense a weight of items in the loading container;
    a container surrounding at least a portion of the weight scale and coupled to the frame;
    an electronic product identification device coupled to the frame;
    an electronic display coupled to the frame; and
    a computer processing device communicatively coupled to the weight scale, the electronic product identification device and the electronic display.

7. The mobile payment station of claim 6, further comprising a mount supporting the weight scale.

8. The mobile payment station of claim 7, wherein the container includes an opening through which at least one of the weight scale or the mount extends at least partially through.

9. The mobile payment station of claim 6, wherein the container is coupled to the frame independent of the loading container.

10. The mobile payment station of claim 6, wherein the container is not in contact with the loading container.

11. The mobile payment station of claim 6, wherein the electronic display is mounted between the handle and the loading container.

12. The mobile payment station of claim 6, wherein the electronic product identification device is mounted adjacent to an upper edge of the loading container.

13. The mobile payment station of claim 12, wherein the electronic product identification device is mounted adjacent to a corner of the upper edge of the loading container.

14. The mobile payment station of claim 12, further comprising an identification device mounted at a front of the loading container.

15. The mobile payment station of claim 6, further comprising a wireless communication device operative to couple the computer processing device to external computer processing devices.

16. The mobile payment station of claim 15, further comprising a power source for providing power to the computer processing device, the weight scale, the electronic product identification device, the electronic display, and the wireless communication device.

* * * * *